United States Patent [19]

Howard

[11] 3,853,089

[45] Dec. 10, 1974

[54] COURSE SELECTOR AND INDICATOR

[76] Inventor: Bernard Howard, 73 McKinley Ave., New Haven, Conn. 06515

[22] Filed: Feb. 6, 1974

[21] Appl. No.: 440,197

Related U.S. Application Data

[63] Continuation-in-part of Ser. Nos. 259,433, June 5, 1972, abandoned, and Ser. No. 312,918, Dec. 7, 1972, abandoned.

[52] U.S. Cl. ............ 116/129 R, 33/349, 116/129 L, 240/1 EL, 340/380, 250/227, 356/142, 350/96 B
[51] Int. Cl. ............................................. G09f 9/00
[58] Field of Search ....... 116/129, 129 L; 33/363 K, 33/364, 349, 331, 363 Q, 363 L; 350/96 B; 340/347, 380; 250/72, 227; 240/2.1, 1 EL; 356/142

[56] References Cited
UNITED STATES PATENTS

| | | | |
|---|---|---|---|
| 1,474,816 | 11/1923 | Day | 250/72 |
| 1,873,684 | 8/1932 | Urfer | 240/2.1 |
| 1,891,068 | 12/1932 | Stahl, Jr. | 33/349 |
| 2,561,508 | 7/1951 | Gregorie et al. | 340/380 X |
| 2,868,960 | 1/1959 | Appel et al. | 240/2.1 |
| 3,234,657 | 2/1966 | Hull | 33/364 |
| 3,349,406 | 10/1967 | Perry et al. | 350/96 B |
| 3,353,440 | 11/1967 | Benford | 356/142 |
| 3,393,800 | 7/1968 | Durand, Jr. | 350/96 B X |
| 3,502,857 | 3/1970 | Cleveland et al. | 116/129 X |
| 3,538,312 | 11/1970 | Gehahr | 350/96 B |
| 3,609,336 | 9/1971 | Coppola | 240/2.1 |

*Primary Examiner*—Louis J. Capozi
*Attorney, Agent, or Firm*—DeLio and Montgomery

[57] ABSTRACT

A compass and course indicator comprising a compass having means for directing energy toward the indicator from a point determined by magnetic North, a positionable course selector and indicator which receives the directed energy in a discrete indication of direction and which indicates the accuracy of any selected course or necessary course correction with respect to the selected course, as well as the magnitude of directional error.

32 Claims, 27 Drawing Figures

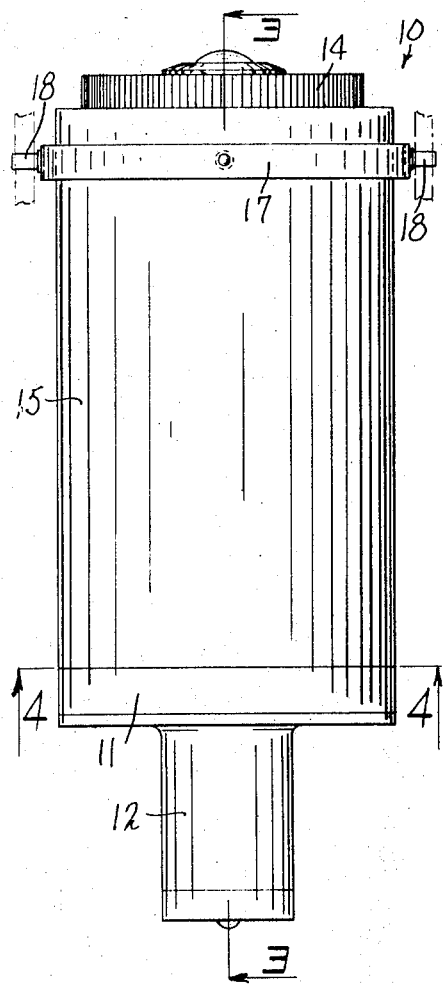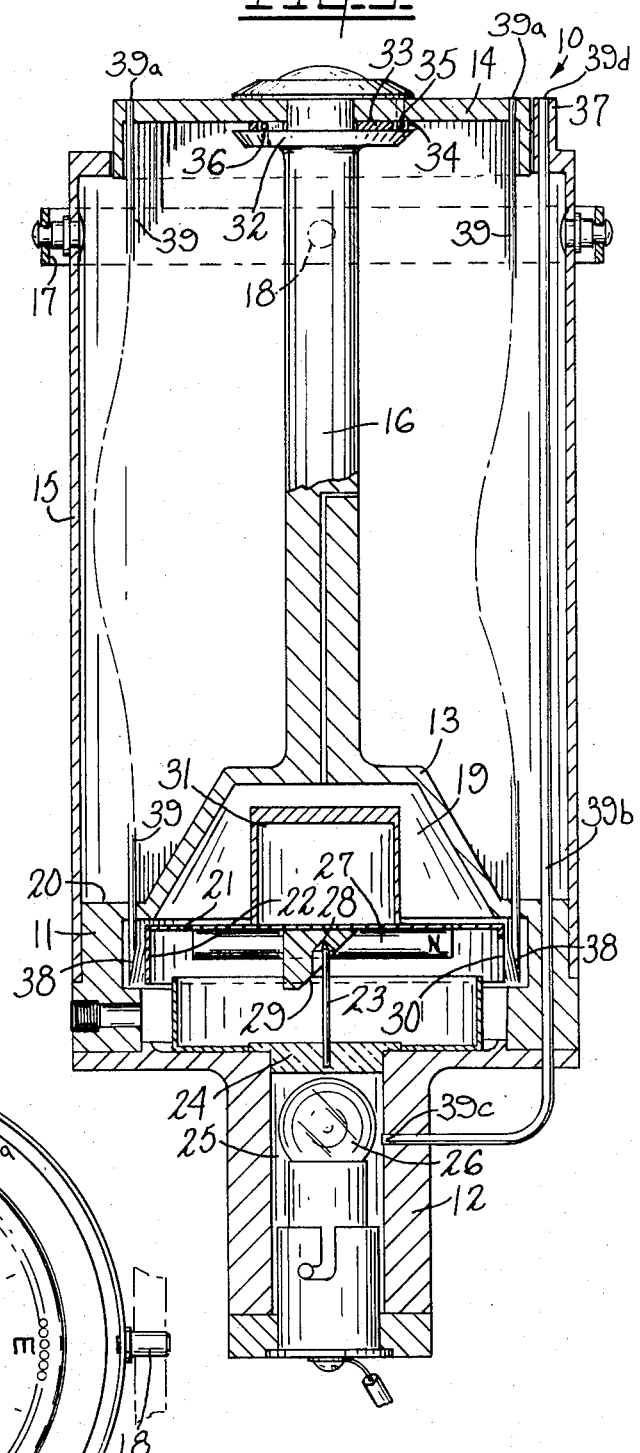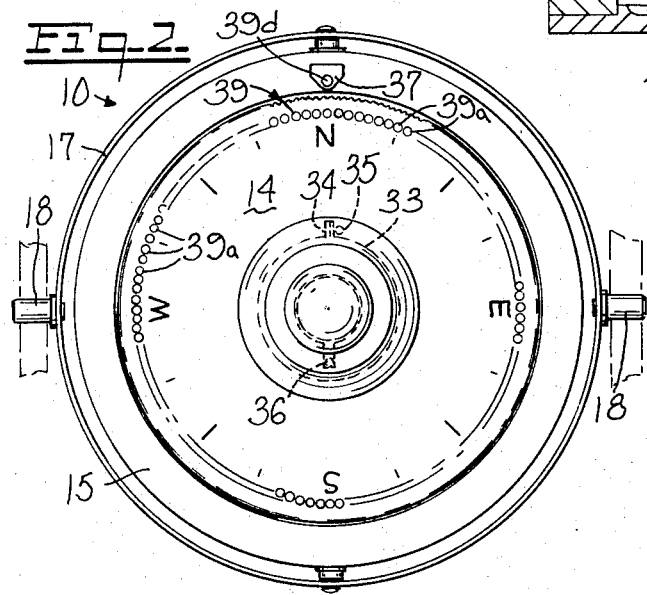

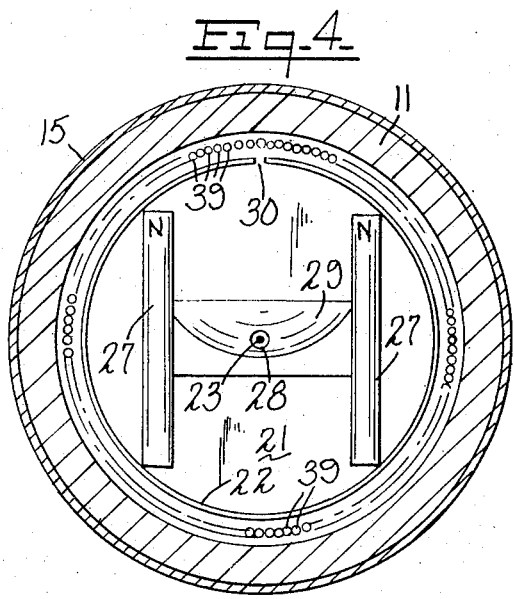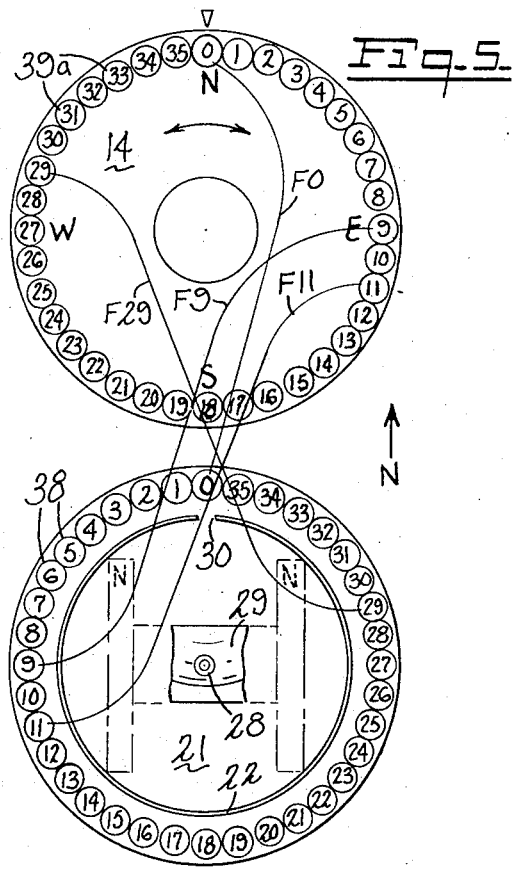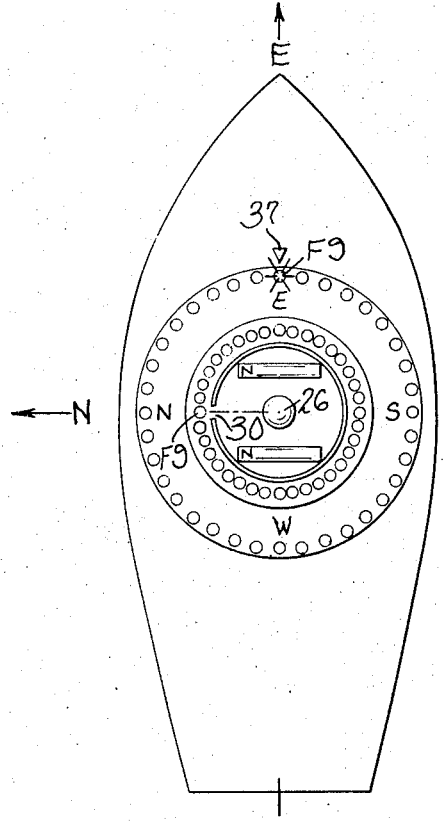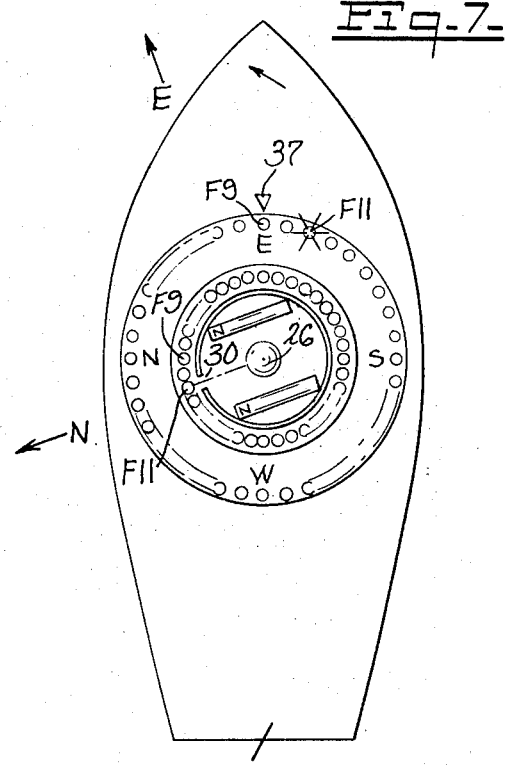

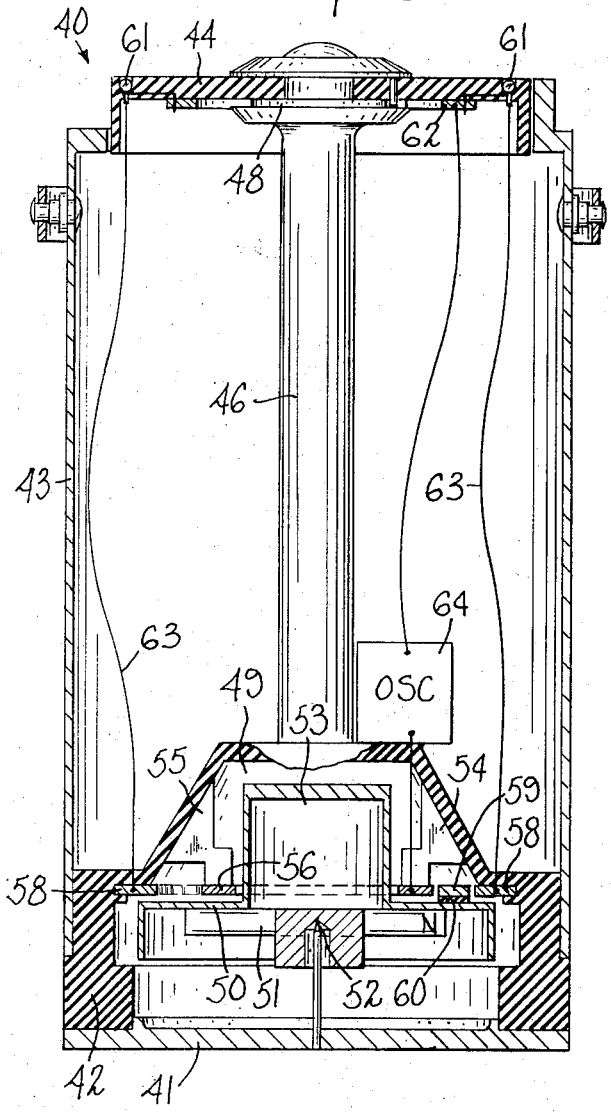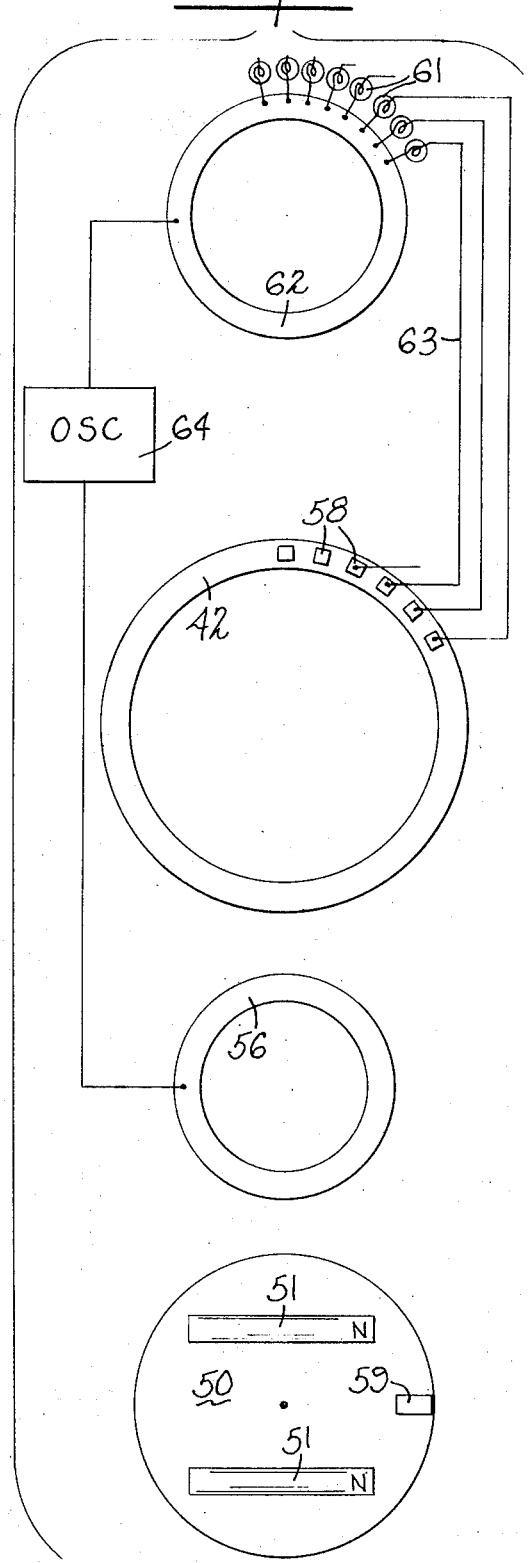

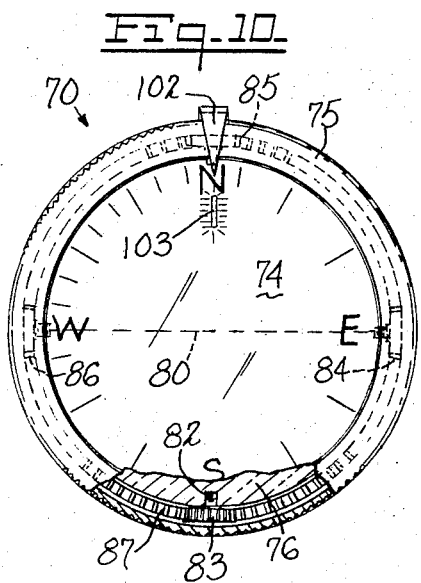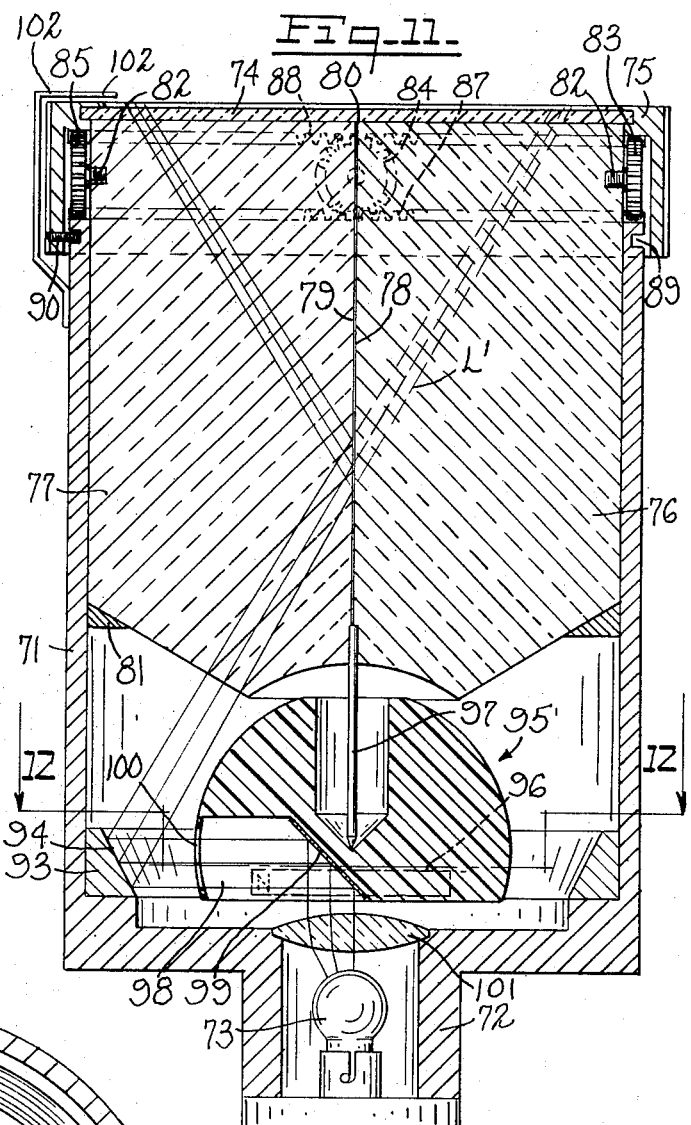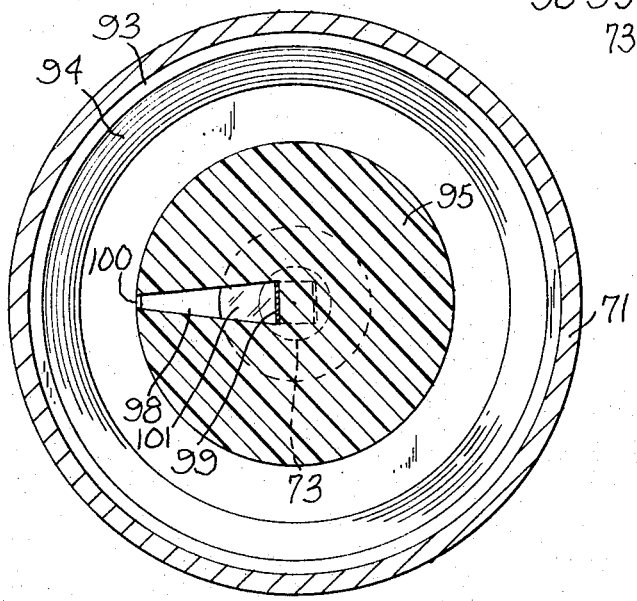

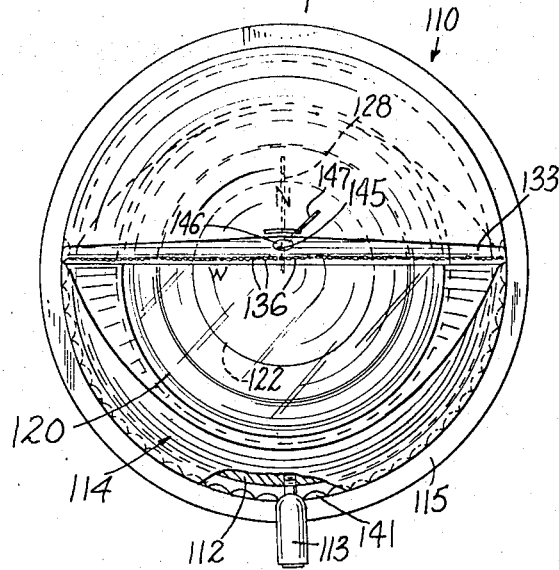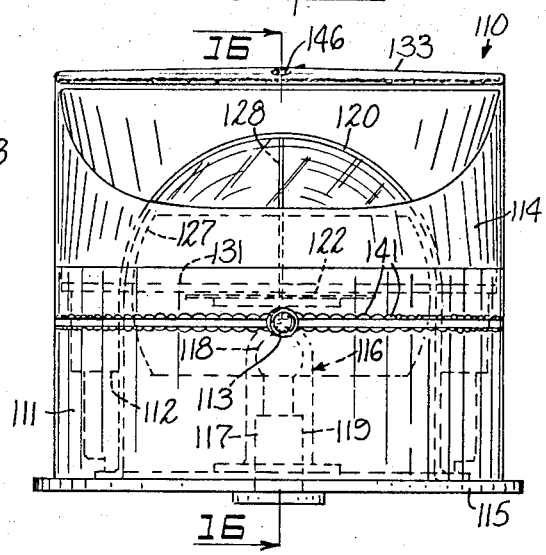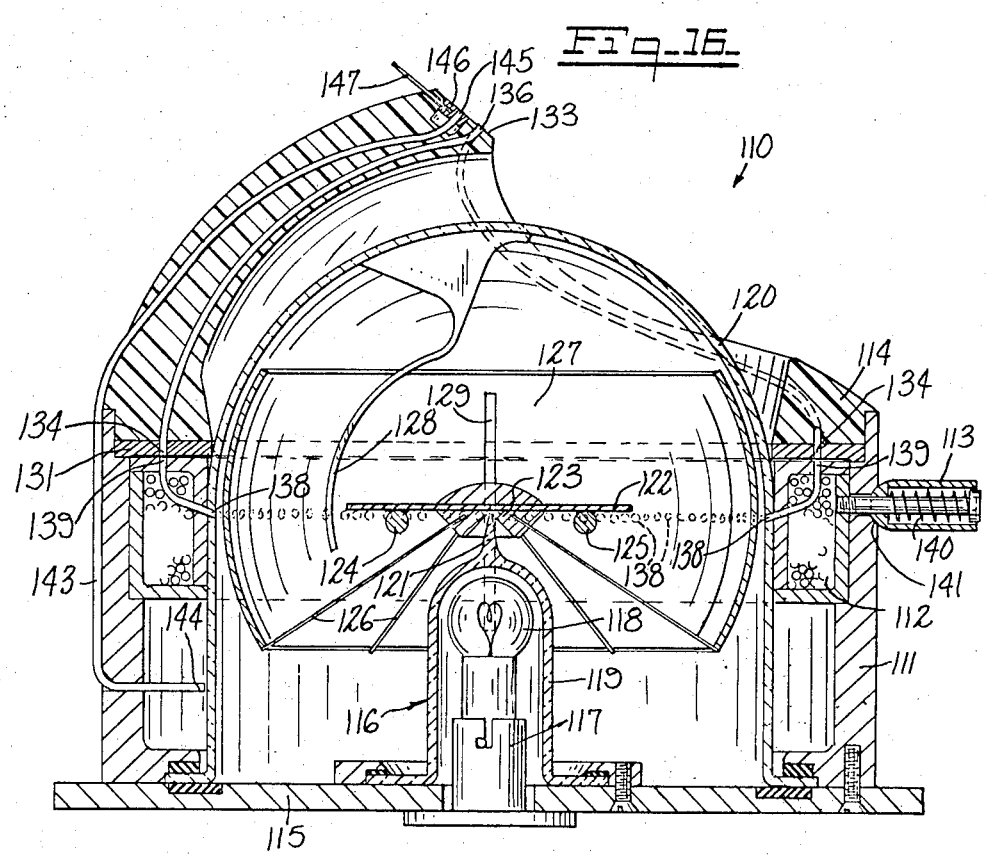

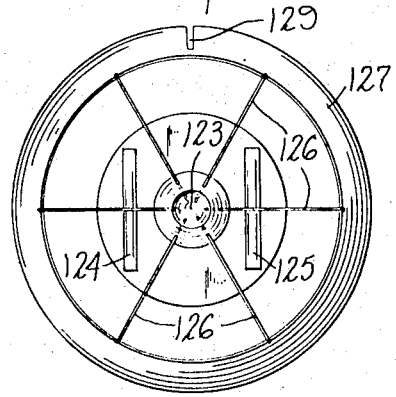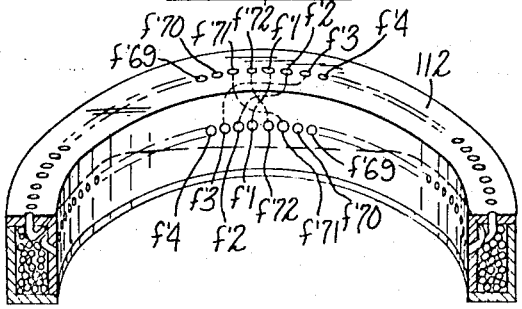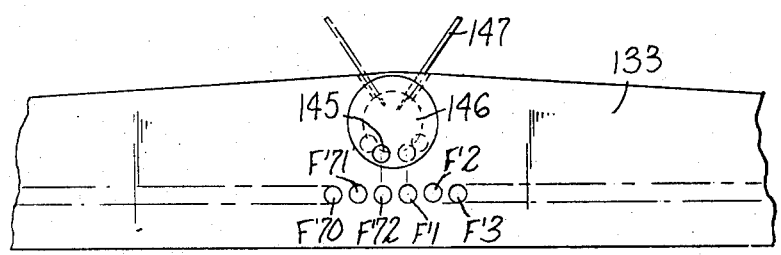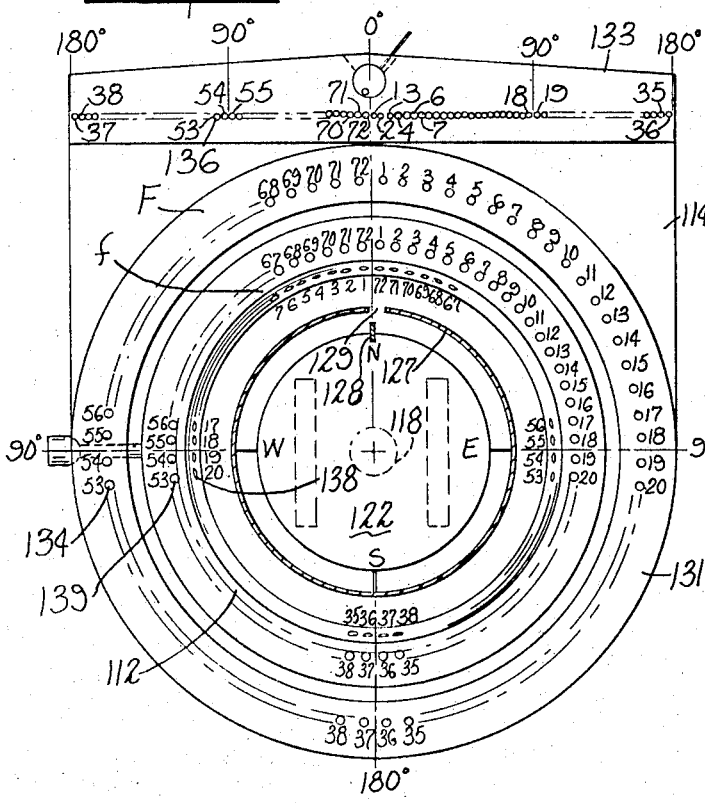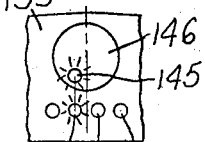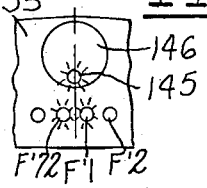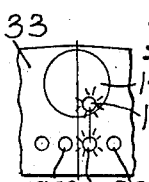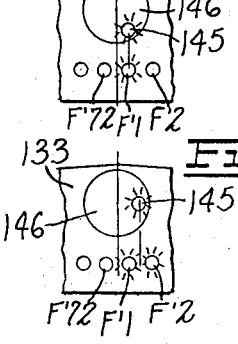

3,853,089

COURSE SELECTOR AND INDICATOR

This application is a combined continuation-in-part of copending applications Ser. No. 259,433, filed June 5, 1972 and Ser. No. 312,918, filed Dec. 7, 1972 both now abandoned.

This invention relates to course indicators, and more particularly relates to compass controlled course indicators which will give an illuminated indication of a selected course.

In the use of compasses to follow a given direction or heading, a course in degrees is selected and the helmsman steers the course by means of the position of the compass with respect to a reference generally referred to as a lubber line.

Such use of the compass to maintain the ship on a given course is very tiring on the helmsman in that the helmsman may become confused as the ship may, for a variety of reasons, depart from the chosen course, and also because the direction of correction is opposite from an indication of error on the compass card. For example, if a desired course is selected to be 90 degrees which is due East and the actual heading should change to 120 degrees, the due East or 90 degree point on the compass card would be at 60 degrees relative to the desired heading. The helmsman, unless quite experienced, is liable to steer to the right to bring the 90 degree point back to the lubber line. However, this would be the opposite correction and the error could be further compounded before final correction is made. This is a problem that has plagued most non-professional helmsmen since the advent of sea travel.

Additionally, on most private ships, the compasses are fairly small in diameter and the displays used thereon are often fatiguing to view for any length of time.

Accordingly, the present invention provides a course selector and indicator which may be set to present a selected course beneath a reference or lubber line and further includes means for illuminating the actual course as a point or line to which the helmsman will steer. A compass embodying the invention is further so arranged that the illuminated point showing the selected course will be so positioned with respect to the lubber line or a reference indication such that there will be no indefiniteness or indecision in the mind of the helmsman as to which way to steer to make a correction.

Briefly stated, the invention in one form may comprise a housing having a pivotal magnetic member which always follows a predetermined position with respect to magnetic North. Positioned around the periphery of the pivotal member are a plurality of equi-angularly spaced energy-receiving means. The energy-receiving means are associated with energy-transmitting means, each of which is connected to an energizable course indicator. A course selector and indictor means may be relatively rotated with respect to a stationary receiving means or vice versa. An energy source is provided within the housing such that energy is directed to the energy-receiving means aligned with magnetic North. This will then provide on the corresponding indicator an illuminated point source indication of magnetic North transposed to the actual course set at the lubber line or reference indication. The invention may also be embodied in other constructions described herein.

A preferred embodiment of the invention comprises a plurality of optical fibers having one end arranged in an annular pattern equi-angularly spaced in a stationary housing with the second ends thereof fixedly arranged in a linear pattern in corresponding relation to provide an indicating means. Disposed within this annular array is a compass and a light-energy source. The light-energy source will transmit a beam through a reference position in the compass housing. Intermediate the compass housing and said stationary array is a movable member having a plurality of light-transmitting elements in the form of optical fibers adapted to transmit light from the reference position of the compass to one of said plurality of light-indicating fibers. With this arrangement, the intermediate member may be utilized as a course selector to position a desired course opposite the reference light beam source and thus transmit to the indicator an indication of when the selected course is achieved, and/or any deviation from the selected course.

An object of this invention is to provide a compass having a new and improved construction which facilitates reading thereof for purposes of steering a course.

Another object of this invention is to provide a new and improved compass controlled course selector and indicator.

Another object of this invention is to provide a new and improved compass course indicator in which a selected course is illuminated and indicated as a discrete point indication.

A further object of this invention is to provide a new and improved course selector and indicator in which there is a positive indication of the selected course and the direction to steer in the event there is an error in heading.

A still further object of this invention is to provide a compass and course selector and indicator having new and improved means in which an error in course and the direction of correction may be easily comprehended.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a view in elevation of a course selector and indicator construction embodying the invention;

FIG. 2 is a top plan view of the device of FIG. 1;

FIG. 3 is a view seen in the plane of lines 3—3 of FIG. 1;

FIG. 4 is a view seen in the plane of lines 4—4 of FIG. 1;

FIG. 5 is a view of the course selector and indicator and the magnetic member of FIG. 1 together with a schematic representation of the connections of the energy-transmitting means;

FIGS. 6 and 7 are views similar to FIG. 4, but showing the relationship of the compass to a ship;

FIG. 8 is a half section elevation of another embodiment of the invention;

FIG. 9 is a schematic representation of the operative elements of the device of FIG. 8;

FIG. 10 is a top plan view of another embodiment of the invention;

FIG. 11 is a view in half section of the device of FIG. 10 turned 90 degrees;

FIG. 12 is a view seen in the plane of lines 12—12 of FIG. 11;

FIG. 14 is a plan view of a device embodying the invention;

FIG. 15 is a front elevation of the device of FIG. 14;

FIG. 16 is a view in half section seen in the plane of lines 16—16 of FIG. 2;

FIG. 17 is a plan view of a compass housing utilizing the device of FIGS. 14–16;

FIG. 18 is an isometric view partially in section of a course selector utilized in the device of FIGS. 14–16;

FIG. 19 is an enlarged view of a portion of the course indicating device of FIGS. 14–16;

FIG. 20 is a view which is partially schematic to show the layout and connections of the light-receiving and transmitting means of the device of FIGS. 14–16;

FIGS. 23a – 23d are simplified diagrams exemplifying positioning of a fine adjustment member.

Figure 13A:
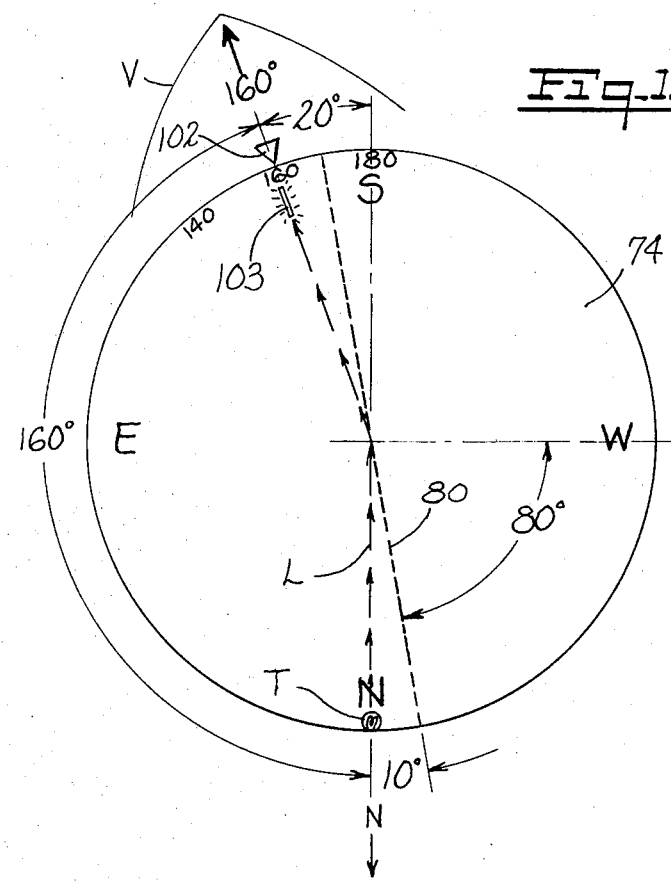
FIGS. 13a and 13b are diagrammatic representations of the operation of the device of FIGS. 10 – 12.

A first device 10 embodying the invention may generally comprise a base member 11 which may include a housing 12 for an energy source, a compass housing member 13 supported on base 11, a rotatable course selector and indicator member 14, and a housing member 15. Selector and indicator member 14 is rotatable through not more than 360 degrees on a shaft 16 which extends upwardly from housing member 15. Housing member 15 preferably includes a ring 17 mounted thereto with extending gimble journals 18.

Housing member 13 defines a compass compartment 19, and further includes a radially outwardly extending annular portion 20.

A compass means comprising a card or disc 21 having a peripheral depending skirt 22 is rotatably supported on a central bearing member 23 within compartment 19. Member 23 is mounted to a transparent member 24 which covers a compartment 25 in base 11 for a source of light energy, exemplified as lamp 26. The compass means further comprises a pair of magnets 27, equi-shaped in parallel relation on either side of axis of rotation 28, as more clearly shown in FIG. 4. The compass means further comprises an energy-directing means in the form of a prism or lens 29 contoured to direct light from source 26 to and through a slot 30 in shirt 22 toward magnetic North. Lens 29 includes bearing surfaces shaped complementary to the end of bearing member 23. Compartment 19 is adapted to be filled with a damping fluid. A float 31 is carried on card 21.

With the construction described, as the card 21 pivots or rotates on bearing 23, a thin bundle or fan of light energy is directed through slot 30, and may sweep 360 degrees as the card turns.

A flange 32 on shaft 16 supports an annular detent member 33 beneath selector and indicator member 14 to limit rotation thereof to 360 degrees. Selector and indicator 14 may rotate 180 degrees in either direction from a stop 34 extending radially from detent member 33 which is engaged by a pin 35 carried by selector and indicator member 14. Detent member 33 is prevented from rotating by a pin 36 extending into an aperture in detent member 33. A reference or lubber line providing member 37 is carried on housing 15, and is adapted to provide an illuminated lubber line.

Carried by radially extending portion 20 in annular array with equi-angular spacing therebetween is a plurality of energy-receiving means in the form of beveled receiving ends 38 of flexible optical fiber rods 39. The beveled ends are positioned to receive the fan of light energy passing through slot 30. Any number of fiber rods 39 may be utilized depending upon the diameter of the annulus in which they are arranged. Typically, the fiber rods 39 may be only 0.040 inch in diameter. If 180 fiber rods are utilized each adjacent pair would be spaced two degrees. If the diameter of the compass is sufficient, 360 fiber rods may be utilized, each representative of one degree. The fiber rods 39 are flexible and each having an indicating end 39a received in selector and indicator 14.

Light energy directed upon one of the beveled receiving ends 38 is transmitted along the length of the fiber rod and the indicating end 39a is illuminated. An additional fiber rod 39b has an end 39c in communication with the interior of housing 12 and indicating end 39d positioned to illuminate a translucent marker 37. The reference marker is thus always illuminated. The flexible fiber rods are selected to be of sufficient length to permit selector and indicator member 14 to be rotated 360 degrees, and also for the connections hereinafter described.

With this arrangement, when a course is selected, selector and indicator 14 is rotated to place the desired heading in line with marker 37. If the vessel is steered correctly the indictor 39a aligned with marker 37 will be illuminated. Such positioning of selector and indicator member 14 essentially couples the selected fiber rod 39a to magnetic North. As shown in FIG. 2, if a due North heading is desired, selector and indicator member 14 is positioned as shown. So long as this course is held, the indicating end 39a aligned with marker 37 will be illuminated. If the vessel drifts off course, card 21 will rotate, and such rotation will be evidenced by successive illumination of indicating ends 39a in one direction or the other dependent on the direction of drift. The helmsman will then steer to move the illumination back to the indicator aligned with the lubber line.

In accordance with another aspect of the invention, the receiving means and indicating means may be connected in reverse rotational sequence to provide an indicating system which essentially eliminates helmsman fatigue.

FIG. 5 exemplifies selector and indicator member 14 and compass card 21 with thirty-six positions, or one each 10 degrees. The lesser number of positions is set forth to simplify illustration.

Fiber rod F0 is connected to a position on member 20 which represents magnetic North and is a reference position. Fiber rod F0 is also connected to selector and indicator member 14 at the reference N position. Fiber rod F9 is connected to member 20 at a position of 270 degrees clockwise or 90 degrees counter-clockwise, and to selector and indicator member 14 at a position of 90 degrees clockwise, all references taken from N. Similarly fiber rod F29 is connected 60 degrees clockwise from N on member 20 and 60 degrees counterclockwise from N on selector and indicator member 14. Connections of the other fiber rods, not shown, would be in a similar manner as exemplified in the following table.

TABLE

| Fiber | Position on Selector 14 | Position on Member Flange 19 |
| --- | --- | --- |
| F0 | 0° | 360° |
| F1 | 10° | 350° |
| F2 | 20° | 340° |
| F3 | 30° | 330° |
| F4 | 40° | 320° |
| F5 | 50° | 310° |
| F6 | 60° | 300° |
| F7 | 70° | 290° |
| F8 | 80° | 280° |
| F9 | 90° | 270° |
| F10 | 100° | 260° |
| F11 | 110° | 250° |
| F12 | 120° | 240° |
| F13 | 130° | 230° |
| F14 | 140° | 220° |
| F15 | 150° | 210° |
| F16 | 160° | 200° |
| F17 | 170° | 190° |
| F18 | 180° | 180° |
| F19 | 190° | 170° |
| F20 | 200° | 160° |
| F21 | 210° | 150° |
| F22 | 220° | 140° |
| F23 | 230° | 130° |
| F24 | 240° | 120° |
| F25 | 250° | 110° |
| F26 | 260° | 100° |
| F27 | 270° | 90° |
| F28 | 280° | 80° |
| F29 | 290° | 70° |
| F30 | 300° | 60° |
| F31 | 310° | 50° |
| F32 | 320° | 40° |
| F33 | 330° | 30° |
| F34 | 340° | 20° |
| F35 | 350° | 10° |

Assume that it is desired to steer a course of 90 degrees, or due East. Selector and indicator member 14 is rotated to present the E marker on member 14 and the end 38 of fiber F9 beneath the marker 37. The upper surface of selector and indicator member 14 is calibrated in the major directions as shown, and will also have intermediate graduations as desired in any design. When the desired heading is achieved the receiving end 38 of fiber rod F9 is opposite slot 30 and receives directed light energy from source 26. When the vessel is heading due East, the receiving end 38 of fiber rod F9 will be pointing North and receive light energy through slot 30.

Assume that the helmsman allows the vessel to drift off course such that the vessel has a heading of 110 degrees East by South, compass disc 21 will rotate to align slot 30 with the receiving end of fiber rod F11. Energy will be transmitted to the indicating end 39a of fiber rod F11 which will be illuminated to show that the vessel is off course to the right. The helmsman will then steer left to correct and will note that the indicating end of fiber rod F10 will become illuminated as the correction is made, and will hold course when fiber rod F9 at the marker is illuminated.

With this arrangement, the validity of the selected course is always positively shown, and any course error is shown, not only in degree but in positive direction.

The face of selector and indicator member 14 is calibrated in degrees as desired and may bear any artistic design or compass configuration.

Another embodiment of the invention is exemplified in FIGS. 8 and 9. In this embodiment the indicators are small electrical discharge lamps, such as neon bulbs. The overall device is essentially the same as shown in FIG. 1. The device 40 embodying the invention comprises a base member 41 having a support member 42 thereon, housing member 43 and selector and indicator member 44.

Extending from member 42 is a shaft 46 having a flange member about which selector and indicator member 44 is rotatable. A detent member 48 is provided to limit rotation of member 44 as previously described. Support member 42 defines a compass compartment 49 which includes a compass card 50 having parallel magnets 51 thereon equally spaced on either side of the pivot point 52. Card 50 may further include a float member 53. The compartment 49 is filled with a compass damping liquid which is non-conductive. Support members 54 and 55 carried by member 42 within compartment 49 support a conductive ring 56.

Carried in an annular array in member 42 is essentially the same plane as ring member 56 in a plurality of electrical conductors 58 which are equi-angularly spaced in the insulating body of member 42. Supported on card 50 between the members 58 and ring 56 is a conductor 59 which may be mounted on an insulating or spacing member 60. Each of the conductors 58 is connected by a line to a corresponding electrical discharge lamp 61, a plurality of which are arranged in an equally spaced annular array in member 44 and each of which have one side thereof connected to a common conductive member 62. Each of elements 61, which are preferably small neon bulbs, is connected to one of conductors 58 via an energy transmitting means in the form of a conductor 63. The conductors 63 may be arranged in one or more multiple conductor cables and may be connected either as shown in FIG. 9 or in reverse rotation as previously described.

The conductive element 59 is so arranged on card 50 that it will be aligned with magnetic North.

Conductors 56 and 62 are connected to opposite outputs of a higher frequency oscillator 64.

When conductor 59 is radially positioned between conductor ring 56 and one of conductors 58 or between two of conductors 58 the capacitive impedance between the member 56 and the aligned conductors 58 will be substantially decreased. This impedance will be decreased to such an extent that sufficient energy will be transferred therebetween to energize the neon lamps 61 connected to the aligned conductor or conductors 58. The illuminated conductors will then give an indication referred to magnetic North of compass card 50. Preferably the connection of the members of the conductors 58 to the neon lamp 61 is rotationally reversed, as previously described.

The operation of the device of FIGS. 8 and 9 would be the same as that previously described and no further explanation threof is deemed necessary.

In either of the foregoing examples, the face of the selector and indictor ring may be disposed in a plane which is non-parallel to the plane of the compass. This may easily be accomplished by placing a bend in the shafts 16 or 46. The device is thus adaptable for mounting on a inclined panel.

The invention may also be embodied in a construction which does not require individual energy transmitting means such as the optical fibers or conductors.

Still another embodiment of the invention is shown in FIGS. 10 – 12 in which energy-transmitting means equivalent to an infinite number of the optical fibers or electrical conductors is utilized.

The device 70 comprises a housing member 71 providing a housing 72 for a light energy source in the form of a lamp 73. A selector and indicator member 74 preferably in the form of a disc of frosted glass or ground glass has compass positions thereon as shown in FIG. 10. Member 74 is carried by an annular housing member or collar 75 preferably having a knurled periphery to facilitate positioning.

Supported within the housing are transparent members 76 and 77 which define a diametrically split cylinder for the most part of the length thereof. Adjoining planar surfaces are silvered or otherwise coated to provide mirror surfaces 78 and 79, respectively. The surfaces 78 and 79 define a junction line 80 mirrored on either side thereof which extends diametrically with respect to the axis of member 74 and the compass. The members 76 and 77 are rotatably supported on an annular support member 81 extending from the inner wall of housing 71.

The members 76 and 77 also define apertures spaced essentially 90 degrees apart for the journals 82 of pinions 83 – 86.

The pinions 83 – 86 mesh with a gear 87 defined on the upper edge of housing member 71 and a gear 88 defined on the under surface of collar 75. A groove 89 is defined in the periphery of housing member 71 and receives one or more pins 90 extending from member 75. This arrangement secures collar member 75 to housing member 71, while maintaining the gears in mesh with the pinions and permitting rotation of member 75.

The relationship between collar 75 carrying the frosted indicator dial 74 therewith and housing 71 will be recognized to be a conventional differential arrangement. The gearing is selected so that members 76 and 77 will rotate at one-half the rate of collar 75 when collar 75 is rotated.

Disposed within housing 71 is a mirror 93 having a beveled annular surface 94. Mirror surface 94 is coaxial with indicator 74.

The device 70 further includes a compass device 95 which is in the form of a float and which carries magnets 96 equi-distantly spaced in parallel relationship on either side of a pivot-providing member 97 extending from members 76 and 77.

Member 95 is made of a floatation material such as urethane. A recess 98 is defined in the underside thereof, and a mirror 99 is secured therein to reflect light energy from source 73 through a narrow slot 100. A lens 101 transmits light from source 73 and closes the compass compartment. The compass compartment is filled with conventional compass damping fluid.

Light energy directed from mirror 99 is reflected from surface 94 to one of surfaces 78 and 79 (surface 79 as shown in FIG. 11) to member 74, where it will appear as indicated by the reference numeral 103, FIG. 10. The representation 103 may be in the form of a bar, as shown, an arrow, a round point, or an arrow head depending on the shape of slot 100.

FIG. 10 shows the indicator in a position for a heading of magnetic North when that course is achieved. In this position, and as further exemplified in FIG. 11, light energy passes through lens 101, is reflected at essentially 90 degrees from mirror 99 through slot 100 on to mirror surface 94. Hence, the reflected energy is transmitted to surface 79 and, hence, reflected to indicator and selector member 74.

If another course is desired, the member 74 is rotated to present that course beneath a reference marker or lubber line 102 by rotating collar 74. Upon such rotation, the members 76 and 77 providing the mirror surfaces 78 and 79, which extend diametrically with respect to the axis of the compass and member 74, rotate one-half the number of degrees of member 74. Then, light energy will appear to emanate from magnetic North as reflected from mirror surface 94 and will be incident upon and reflect from line 80 at equal angles.

When the selected course is achieved, the indication 103 will reside in line with lubber line 102. This will give an indication to the helmsman that the ship is on the selected course. If the ship should drift off course, the compass member 95 will pivot to magnetic North and the indication 103 will appear to rotate from the lubber line. The helmsman will then make the necessary correction to bring the illuminated marker 103 back to the lubber line.

Figure 13B:
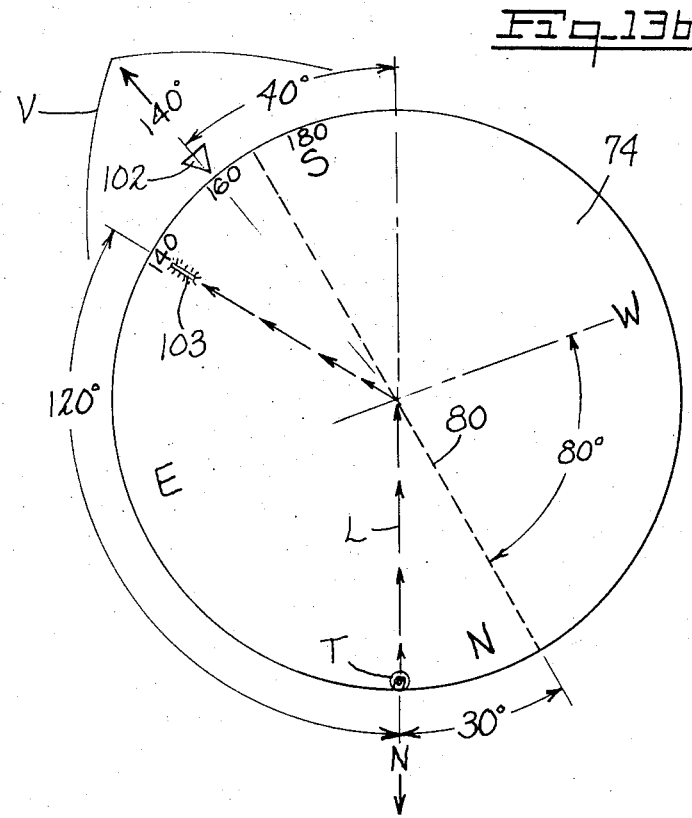

With reference to FIGS. 13a and 13b, assume that a heading of 160 degrees is desired on a vessel V.

Member 74 is rotated 160 degrees counter-clockwise from the position shown in FIG. 10, to present the 160 degree indication to lubber line 102. This movement produces 80 degrees of rotation of mirror line 80. When this course is achieved, light energy as indicated at T will appear to emanate from magnetic North on mirror surface 84. A beam L of light energy will be directed radially inwardly from mirror 93 to mirror 79 at an incident angle of 10 degree and be reflected radially outwardly at the same angle to give an illuminated point or line indication at the 160 degree mark on indicator 74 as shown in FIG. 13a.

The helmsman will then have an illuminated course indication to steer by. If the course of vessel V should drift to a heading of 140 degrees, or left 20 degrees, as shown in FIG. 13b, the entire device 70 will change with the heading of vessel V. However, light source T will still emanate from magnetic North and the beam L will now be incident on mirror line 80 at 30 degrees, and will be reflected at the same angle to provide an illuminated indication at the 140 degree mark. This will indicate an error of 20 degrees left, from the lubber line 102. The helmsman will then steer the vessel V to the right, and as the course correction is made the illuminated indication 103 will appear to rotate toward lubber line 102. When the selected course is achieved the indication 103 will be aligned with lubber line 102.

If a course of due South should be selected, the light beam L will now be reflected from one of surfaces 78 or 79 but will be directed as shown by beam L′, FIG. 11, and straddle the line 80 (which will be rotated 90 degrees from the position shown in FIG. 11) to provide the indication 103.

In all of the foregoing embodiments of the invention, there is provided a source of energy emanating or apparently emanating from magnetic North together with energy transmitting means and an illuminated heading marker on a course selector and indicator. In the preferred form, the indication marker is rotationally reversed with respect to the compass means. This gives an indication of the true directional error as well as the magnitude thereof. The means of illumination are such that it may be viewed in daylight as well as dark. If desired a hood may be provided to shade the indicators. The marker may take any geometrical configuration, as previously stated.

In this embodiment, there is no necessity for a means for limiting rotation of the course selector. Another advantage provided by the invention is that the selected course may always be positioned at a "twelve o'clock" position beneath the lubber line and provide an illuminated marker at this point, so that the helmsman does not have to attempt to read degrees from a compass card or rose.

Throughout the foregoing description, the source of energy has been described as originating or being directed from magnetic North. However, while the compass card will always orient toward magnetic North, the energy source may emanate or be directed from another position. In such case, the other position becomes the reference and suitable relationship must be made between the energy receiving and transmitting means and the course selector and indicator so that the selected course is referenced to the reference position. For example, assume the embodiment of FIGS. 10–12 was constructed so that the energy source T appeared to emanate from East. Then the markings on the selector and indicator member would have to be translated 45 degrees counterclockwise, as viewed in FIG. 10, with respect to line 80. Then, when a course of due North was selected and achieved, the light beam L would be incident on, and reflect from one of the surfaces 78 or 79 at 45 degrees to provide the indication 103 at North.

Another, and more preferred embodiment of the invention is set forth in FIGS. 14 - 23.

With initial reference to FIGS. 14 - 16, a device 110 embodying the invention comprises an annular housing member 111 receiving therein a rotatable selector member 112 which may be positioned by means of a detent handle 113, and an upper housing member 114, all of which rest on a base member 115. Extending upwardly from base member 115 is a light energy source 116 comprising a lamp socket 117 receiving a lamp 118 therein, all sealed within a transparent housing 119 to base member 115, with a transparent compass housing 120. Pivotally mounted within compass housing 120, as for example upon pivot bearing 121 integral with member 119 is a compass card 122 on a bearing member 123. Card 122 includes conventional magnets 124 and 125. Bearing member 123 has supports or struts 126 emanating therefrom to support a mask 127 shown as a section of a sphere. The inside of housing 120 is filled with the conventional compass dampening fluid.

Depending from the upper portion of compass housing 120 is lubber line indicator or reference marker 128 adapted to cooperate with the directional symbols on the rose of compass card 122 and thus provide the normal compass function.

Defined in mask 127 is a slot 129 designed to permit transmission of a beam of light energy through mask 127 in a vertical plane sufficiently long to compensate for any rolling or pitching of the vessel. The slot 129 is in a reference position usually selected to be in alignment with magnetic North of the compass.

Upper housing member 114 comprises a disc-like base member 131 and an upper member cast thereon preferably of a cast plastic material 132 which provides a surface 133 adapted to present a linear arrangement of discrete indicating means. The indicating means are a plurality of optical flexible fiber rods F' designated as F'1 – F'72 which as shown in FIG. 20 have one end 134 equiangularly spaced and secured in mamber 131. The fiber rods are led from the ends 134 through casting 132 to surface 133 where the other ends 136 are visible and serve as indicators. The fiber rods F' also comprise energy-transmitting means.

The arrangement of the various fibers is more clearly shown in FIG. 20. By way of example only, the end of a fiber rod F'1 is displaced 2 ½ degrees with respect to North when the compass is oriented with respect to North as is the end of fiber rod F'72 in a clockwise progression. With this arrangement any light incident on an end 134 of a fiber rod F' will be transmitted to a corresponding position on an end 136 which is visible at surface 133.

Rotatable member 112, which is a course selector contains a like number of light-receiving and transmitting means $f'$ also in the form of optical fiber rods $f'1 - f'72$. Each fiber $f'1 - f'72$ has one end 138 disposed to receive light which is transmitted through slot 129 and the other end 139 adapted to be aligned with an end 134 of a fiber rod F'. As shown, each fiber rod $f'$ has one end 139 oriented in a horizontal plane with the other end 138 oriented vertically.

To provide a positive indication of any course deviance, the two ends of the fiber rods $f'$ are reversely disposed. As shown in FIGS. 18 and 20, the end 138 of fiber rod $f'1$ is disposed 2 ½ degrees counterclockwise of North while the end 139 is disposed 2 ½ degrees clockwise of North in relation to the position of the compass. In a similar manner, end 138 of fiber rod $f'2$ is disposed 7 ½ degrees counterclockwise of North while end 139 is disposed 7 ½ degrees clockwise of North. Otherwise stated, the two ends of each fiber rod $f'$ are positioned in reverse rotational order about selector 112, and equi-angularly spaced with respect to a reference position. As will hereinafter be made apparent this provides a reversal of the light-transmitting capabilities of the fiber rods $f'$ and will result in a positive indication of any course deviation.

As thus far described, when a beam of light energy is directed through slot 129 it will be incident on one or two of the ends 138 of a fiber rod $f'$ and will be transmitted to the other end 139 thereof. Each end 139 of a fiber rod $f'$ will be in alignment with an end 134 of a fiber rod F'. The light received by fiber rods $f'$ will be transmitted through fiber rods $f'1$ and illuminate and indicate an end 136 of a fiber rod F' on surface 133.

The course selector member is positionable through rotation of detent handle 113. Handle 113 may be pulled backwardly against the bias of a spring 140 and out of a detent 141. The detents 141 are arranged for approximately 180 degrees or slightly more in housing 111. As hereinafter explained, this corresponds to 360 degrees of the compass for course selection. With the handle pulled back, selector member 112 may be rotated to move member 112 to a given position and select a course.

Each of the detent notches 141 is indicative of 10 degrees of the compass in the example set forth, and the notches may be calibrated from 10 degrees to 360 degrees in a counterclockwise direction as shown in FIG. 20. This will move the ends of fiber rods f′ a distance of two angular fiber spacings with respect to the ends 134 of fibers F′.

A reference indicator fiber rod 143 has one end 144 positioned to receive light energy at all times, and the other end 145 carried in a manner 146 which is rotatable for alignment with the ends 136 of either of fiber rods F′1 or F′72, as most clearly seen in FIG. 19. A small handle 147 is attached to member 146 for this purpose. This adjustment is provided in view of the number of fibers used in the disclosed embodiment, and allows end 136 of either fiber rods F′1 or F′72 to be utilized as the base indication for course headings in fine increments.

The ends 138 and 139 of each of fiber rods f′ are angularly displaced by a predetermined angle, dependent on the number of fiber rods f′ and F′ utilized. The two ends of fiber rods f′1 are spaced apart a total of 5 degrees. The two ends of fiber rods f′2 are spaced apart 15 degrees. This procession continues to where the end of fiber rod f′18 and the end of fiber rod f′19 are spaced 175 degrees, then decreases to a spacing of five degrees between the ends of fiber rod f′72.

As shown, slot 129 is sufficiently wide to permit a beam of light energy to impinge on the ends 138 of two adjacent fiber rods f′ if centered with respect thereto. When this occurs, two ends 146 of adjacent fiber rods F′ will be illuminated. Assume a course of due North is selected; when this course is achieved end 138 of fiber rod f′72 will receive light energy and end 136 of fiber rod F′1 will be illuminated. Selector 112 is shown in the proper position for a 360 degree or 0 degree heading.

The course selector settings are in 10 degree selection increments. However, member 146 permits 2 ½ degree increment indications. Assume a course of 30 degrees is to be selected. Handle 113 is pulled out and selector 112 moved three detents to the position shown in FIG. 21. When this course is achieved, end 138 of fiber rod f′3 will receive light energy through slot 129, and end 136 of fiber rod F′72 will be illuminated. End 145 of fiber rod 144 may be positioned as shown to provide a lubber line or light.

If a course of 32 ½ degrees were desired, fiber rod end 145 would be positioned between ends 136 of fiber rods F′1 and F′72 as shown in FIG. 23a. Then when this course is achieved, ends 136 of fiber rods F′72 and F′1 will be illuminated. The compass, or more correctly the vehicle, has turned 2 ½ degrees and light from slot 129 is now incident on ends 138 of fibers f′3 and f′4.

If a course of 35 degrees is selected, end 145 of fiber rod 144 is positioned as shown in FIG. 23b. Then when this course is achieved, end 136 of fiber rod F′1 will be illuminated by light transmitted from end 138 of fiber rod f′4. The vessel has turned 5 degrees from the original heading of 30 degrees.

If a course of 37 ½ degrees is selected, end 145 of fiber rod 144 is positioned as shown in FIG. 23d between ends 136 of fiber rods F′1 and F′2. Light is transmitted from ends 138 of fiber rods f′4 and f′5.

In selecting a course to the nearest 2 ½ degrees, for example 217 ½ degrees, selector ring 112 is rotated to select a course which is an even multiple of 10 degrees just below the desired course, in this case twenty-one detents, the fine adjustment member 146 is rotated to a position as shown in FIG. 23d. When the course is achieved, ends 136 of fiber rods F′1 and F′2 will be illuminated.

Assume again it were desired to steer a course on a boat of 30 degrees. As shown in FIG. 20, if the selector ring were not set for the desired course and the course was achieved by the reference to the compass rose, light energy would pass through slot 129 and would be incident on end 138 of fiber rod f′3. The light energy would be transmitted through fiber rod F′6 and indicate an error in the selected course of 30 degrees, in the direction of the error.

Figure 21:
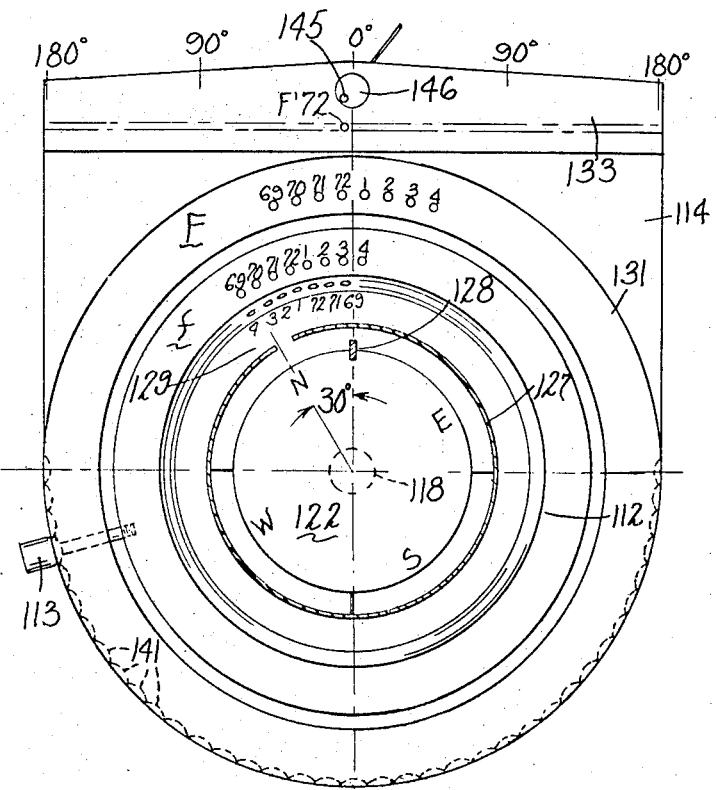
FIGS. 21 and 22 are partially schematic views similar to FIG. 20 set forth to aid in explanation of operation of the device.

When selector ring 112 is rotated to the desired position, as for example three detents counterclockwise from the position shown in FIG. 20 to the position shown in FIG. 21, this error will disappear. Each detent is representative of 10 degrees. This would place selector ring 112 in the position shown in FIG. 21. This moves end 138 of fiber rod f′3 in alignment with slot 129 and end 139 of the same fiber to the position of F′72 as shown in FIG. 20.

Figure 22:
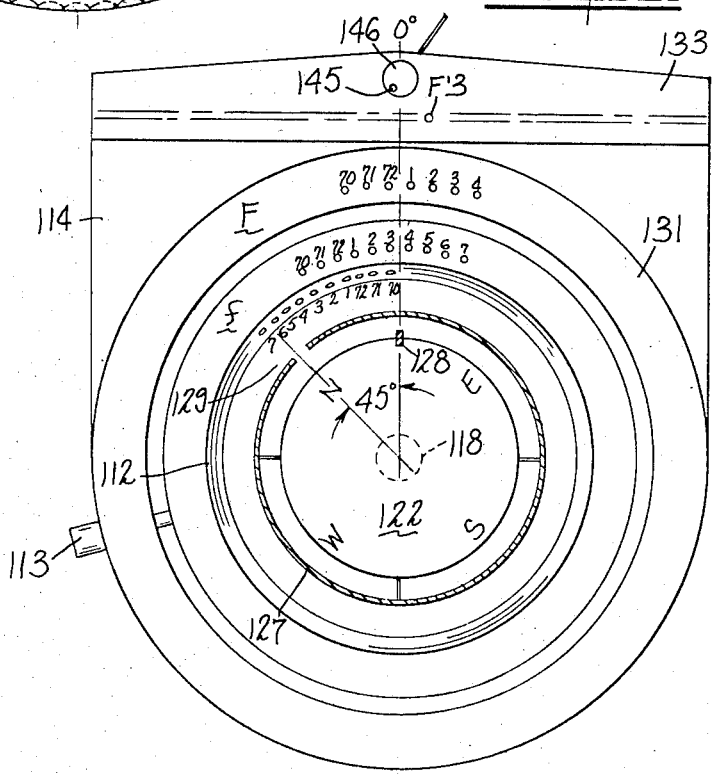

If the heading should drift, say to 45 degrees, as shown in FIG. 22, then end 138 of fiber rod f′7 would receive light energy and transmit the energy to fiber rod F′4 aligned with end 139 of fiber rod f′7. Fiber rod F′4 would thus indicate an error of three increments (5 degrees each) to the right. The helmsman would then make the necessary correction by steering left until the end 136 of fiber F′72 beneath end 145 of fiber 144 was illuminated.

In the disclosed embodiment, the helmsman selects a course to the nearest 10 degrees below the desired course through selector ring 112, then utilizes member 146 to compensate to the nearest 2 ½ degrees. The helmsman always has the presence of the compass rose on card 122 to verify the position of selector ring 112 when the course is achieved.

If size permits, the device could be constructed with one hundred eighty fibers where the spacing between adjacent fiber ends would be two degrees. Then the selector would be provided with ninety-one detent positions (including 0 degrees and 360 degrees) and could be read to each one-half degree.

The reference position of slot 129 may be selected as desired. For example, a due North reference could be chosen such that light would be incident on the ends of both of fiber rods f′1 and f′72. Then, member 146 could be appropriately positioned.

The fine adjustment member may be calibrated for the several increments described.

The shape and layout configuration of the fiber rods is not important so long as one end of fiber rods f′ may receive energy and the other ends may transmit received energy to fiber rods F′. The number of fiber rods f′ and F′ will vary dependent on the size of the instrument desired. An instrument utilizing seventy-two fibers may have a diameter in plan view, and a length of surface 133, of approximately five and one-half inches. Surface 133 may be defined on a radius in a horizontal plane if so desired. With the arrangement disclosed, the compass rose is always available for direct observation and is back-lighted by lamp 123. The entire housing will preferably be mounted on gimbals to maintain a level position.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A course selector and indicator comprising a compass having magnetic means adapted to orient said compass toward magnetic North, a course selector rotatable to select a course adjacent a reference marker, an energy source associated with said compass means adapted to direct energy from a reference position, and transmitting means positionable with said selector adapted to transmit the energy from said reference position to a discrete position on said selector corresponding to the selected course indication when the course is achieved.

2. The device of claim 1 wherein the energy is light energy supplied by a light source, and reflecting means on said compass means adapted to direct a beam of light toward said reference position.

3. The device of claim 1 wherein the reference position is magnetic North.

4. The device of claim 2 further comprising a multiplicity of optical fiber rods having first ends thereof equiangularly spaced about said compass and second ends in annular array and equi-angularly spaced on said selector, whereby the second end of the optical fiber rod on said selector having its first end radially aligned with said reflecting means will be illuminated.

5. The device of claim 4 wherein the second ends of said optical fiber rods are arranged in a rotational order reverse to the rotational order of said first ends.

6. The device of claim 5 wherein said selector is calibrated in compass directions.

7. The device of claim 5 further including means for limiting rotation of said selector to no more than 360°.

8. The device of claim 4 wherein said compass is a card having magnetic means thereon and having a depending skirt, said skirt defining an opening therein adapted to pass light energy from said reflecting means.

9. The device of claim 8 wherein the first ends of said fiber rods are formed on a bevel to receive the directed light energy.

10. The device of claim 2 further including a mirror providng an annular reflective surface adapted to receive directed light energy, said selector being positioned above said compass within a housing means, means within said housing means providing rotatable vertically extending mirror surfaces diametrical with respect to said compass and said indicator, said reflective surface transmitting the reflected light energy to one of said vertically extending mirrors which in turn reflects the energy to said selector.

11. The device of claim 10 wherein said diametrical mirror surfaces are provided by two mating half cylinders of transparent material with the mating surfaces provided with mirror coatings.

12. The device of claim 10 wherein said means providing said vertical mirror surfaces is rotatable at one half the rate of said indicator.

13. The device of claim 10 wherein said diametrical surfaces are aligned with magnetic East and West when a course of magnetic North is selected and achieved.

14. The device of claim 10 further including differential means between said indicator and said diametrical mirror providing means, so that said providing means rotates at one half the rate of said indicator when said indicator is rotated to select a course.

15. A course selector comprising a source of energy, a plurality of energy receiving means disposed in an annular array, compass means including magnetic means rotatably mounted coaxial of said receiving means, energy directing means arranged to direct energy from said source to said receiving means radially aligned with a reference position of said compass means, a rotatable course selector, a plurality of energy receptive course indicating means annularly arranged on said selector, and energy transmitting means coupling each of said receiving means to a corresponding one of said indicating means.

16. The selector of claim 15 wherein an optical fiber rod provides a corresponding receiving means, transmitting means and indicating means.

17. The selector of claim 15 wherein said source of energy is an oscillator, said indicating means are a multiplicity of electrical discharge devices, said receiving means are a multiplicity of electrical conductors, an annular conductor positioned coaxial with said compass means, said receiving means being substantially coplanar with said conductor, said compass means carrying a conductor between said annular conductor and said multiplicity of conductors, and means connecting said oscillator between said multiplicity of discharge devices and said annular conductor.

18. The selector of claim 15 wherein opposite ends of said transmitting means are connected in reverse rotational order between said receiving means and said indicating means.

19. The selector of claim 15 wherein said reference position is magnetic North.

20. A course selector and indicator comprising a compass having magnetic means adapted to orient said compass toward magnetic North, a course selector rotatable to select a course adjacent a reference marker, course indicating means coupled to said selector, an energy source responsive to said compass means for providing energy at a position radially aligned with magnetic North, and energy transmitting means adapted to transmit energy from said position to a discrete position on said indicating means corresponding to the selected course when the course is achieved.

21. A course selector and indicator comprising a source of energy, rotatably mounted compass means, energy directing means arranged to direct energy from said source to a reference position of said compass means, a rotatable course selector coaxial with said compass means, a plurality of energy receiving and transmitting means equi-angularly carried by said selector and arranged to receive energy from said source and directing means, and a plurality of course indicating means arranged to sequentially indicate a plurality of points of the compass, each of said indicating means being arranged to accept energy from one of said receiving and transmitting means to indicate the orientation of the compass with respect to the selected course.

22. The device of claim 21 wherein said energy receiving transmitting and indicating means comprise a plurality of optical fiber rods.

23. A course selector and indicator comprising a source of energy, rotatably mounted compass means, energy directing means arranged to direct energy from said source to a reference position of said compass means, a course selector, energy receiving and transmitting means carried by said selector and arranged to receive energy from said source and directing means, course indicating means arranged to indicate a plurality of points of the compass, said indicating means being arranged to accept energy from said receiving and transmitting means to indicate the orientation of the compass with respect to the selected course, said energy receiving and transmitting means comprising a first plurality of energy conductors each having one end positioned to receive energy from said reference position, said indicating means comprising a second plurality of energy conductors having one end thereof positioned to receive energy from said first conductors and the other ends thereof positioned to provide a visual indication of received energy, the other ends of said first conductors and the one ends of said second conductors being arranged such that the first ends of said second conductors may receive energy from said first conductors, said course selector being movable to align various ones of said first conductors with said second conductors.

24. The device of claim 23 wherein said first and second conductors are optical fiber rods and said energy source is a source of light energy.

25. The device of claim 24 wherein said light source is disposed to radially direct a beam of light toward a reference position of the compass.

26. The device of claim 25 wherein said one ends of said first fiber rods are equi-angularly arranged with respect to each other and adapted to receive light energy from said source.

27. The device of claim 26 wherein said one ends of said second fiber rods are equi-angularly arranged to receive light energy from the other ends of said first fiber rods.

28. The device of claim 27 wherein the other ends of said second fiber rods are arranged in side-by-side relation.

29. A course selector and indicator comprising a plurality of light indicating means linearly positioned and each indicating a predetermined number of degrees of the compass, course selector means, a source of light energy, compass means including light directing means arranged to direct a beam of light energy toward a reference position, said selector means including light transmission means effective to direct light to a predetermined one of said indicating means when the selected course is achieved, and to direct light energy to different ones of said indicating means is proportion to a departure and direction of departure from the selected course.

30. The course selector and indicator of claim 29 wherein said indicating means and said transmission means are optical fiber rods.

31. The course selector and indicator of claim 30 wherein the fiber rods of said selector means have first and second ends, said first ends being equi-angularly disposed to receive light energy from said directing means, said second ends being equi-angularly disposed with respect to each other and angularly progressively spaced from said first ends in a predetermined angular progression in reverse rotational order with respect to the rotational order of said first ends.

32. The selector and indicator of claim 31 wherein the fiber rods comprising said indicating means have first ends angularly disposed to receive light energy from said second ends of said first fiber rods, the second ends of said second fiber rods being arranged in a linear array corresponding in order to the position of said first ends of said second fiber rods.

* * * * *